(12) United States Patent
Yamagishi

(10) Patent No.: US 11,461,972 B2
(45) Date of Patent: Oct. 4, 2022

(54) ELECTRONIC DEVICE, ROBOTIC SYSTEM, AND VIRTUAL AREA SETTING METHOD

(71) Applicant: KYOCERA Document Solutions Inc., Osaka (JP)

(72) Inventor: Yuki Yamagishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 128 days.

(21) Appl. No.: 16/880,020

(22) Filed: May 21, 2020

(65) Prior Publication Data

US 2020/0372712 A1 Nov. 26, 2020

(30) Foreign Application Priority Data

May 24, 2019 (JP) .............................. JP2019-097768

(51) Int. Cl.
| | |
|---|---|
| *G06T 19/00* | (2011.01) |
| *G06F 3/01* | (2006.01) |
| *B25J 9/16* | (2006.01) |
| *G05D 3/20* | (2006.01) |
| *G06V 40/20* | (2022.01) |

(52) U.S. Cl.
CPC .......... *G06T 19/003* (2013.01); *B25J 9/1697* (2013.01); *G05D 3/20* (2013.01); *G06F 3/011* (2013.01); *G06F 3/017* (2013.01); *G06V 40/20* (2022.01)

(58) Field of Classification Search
CPC ...... B25J 13/006; B25J 9/1602; B25J 9/1671; B25J 9/1689; B25J 9/1697; G05D 3/20; G06F 3/011; G06F 3/017; G06K 9/00335; G06K 9/00355; G06K 9/00671; G06T 19/003; G05B 2219/40146; G05B 2219/40314
See application file for complete search history.

(56) References Cited

U.S. PATENT DOCUMENTS

| | | | |
|---|---|---|---|
| 10,384,347 B2 | 8/2019 | Nishitani et al. | |
| 2017/0274532 A1 | 9/2017 | Nishitani et al. | |
| 2018/0353253 A1* | 12/2018 | Bowling | ................ B25J 9/1633 |
| 2019/0291277 A1* | 9/2019 | Oleynik | ................ B25J 9/1669 |
| 2019/0308322 A1 | 10/2019 | Nishitani et al. | |
| 2021/0353381 A1* | 11/2021 | Usui | ..................... A61B 34/20 |

FOREIGN PATENT DOCUMENTS

JP 2017177283 A 10/2017

\* cited by examiner

*Primary Examiner* — Nelson M Rosario
(74) *Attorney, Agent, or Firm* — Studebaker & Brackett PC

(57) ABSTRACT

An electronic device associates coordinates of a virtual space with coordinates of a real space. The electronic device includes an imaging section, a recognition section, a first setting section, and a display controller. The imaging section captures an image or respective images of a hand and a robot in the real space to generate a captured image of the hand and the robot. The recognition section recognizes a gesture represented by a motion of the hand based on the captured image. The first setting section sets the robot in the virtual space based on coordinates of the hand in the virtual space when it is recognized that the gesture corresponds to a first gesture. The display controller controls display of the robot so that the robot is visible to the human eye.

9 Claims, 8 Drawing Sheets

ELECTRONIC DEVICE, ROBOTIC SYSTEM, AND VIRTUAL AREA SETTING METHOD

INCORPORATION BY REFERENCE

The present application claims priority under 35 U.S.C. § 119 to Japanese Patent Application No. 2019-97768, filed on May 24, 2019. The contents of this application are incorporated herein by reference in their entirety.

BACKGROUND

The present disclosure relates to an electronic device, a robotic system, and a virtual area setting method.

A robot controlling device controls a robot based on a simulation result. Specifically, the robot controlling device sets an area in a virtual space based on the simulation result. Here, in the area, an operation of the robot is restricted.

Such a simulation is carried out by a simulation device. The simulation device carries out a simulation of an operation of a virtual robot in the virtual space. The simulation device carrying out the simulation requires creating a three-dimensional model of a work space where the robot works.

SUMMARY

An electronic device according to an aspect of the present disclosure associates coordinates of a virtual space with coordinates of a real space. The electronic device includes an imaging section, a recognition section, a first setting section, and a display controller. The imaging section captures an image or respective images of a subject and a robot in the real space to generate a captured image of the subject and the robot. The recognition section recognizes a gesture represented by a motion of the subject based on the captured image. The first setting section sets a virtual area in the virtual space based on coordinates of the subject in the virtual space when it is recognized that the gesture corresponds to a first gesture. The display controller controls display of the virtual area so that the robot is visible to the human eye. The virtual area corresponds to a boundary area in which an operation of the robot is restricted in the real space.

A robotic system according to an aspect of the present disclosure includes an electronic device and a robot control device. The electronic device associates coordinates of a virtual space with coordinates of a real space. The robot control device controls a robot. The electronic device includes an imaging section, a recognition section, a first setting section, and a display controller. The imaging section captures an image or respective images of a subject and the robot in the real space to generate a captured image of the subject and the robot. The recognition section recognizes a gesture represented by a motion of the subject based on the captured image. The first setting section sets a virtual area in the virtual space based on coordinates of the subject in the virtual space when it is recognized that the gesture corresponds to a first gesture. The display controller controls display of the virtual area so that the robot is visible to the human eye. The robot control device includes a setting section. The setting section sets, based on the virtual area, a boundary area in which an operation of the robot is restricted in the real space.

A virtual area setting method according to an aspect of the present disclosure is a method of setting a virtual area in coordinates of a virtual space associated with coordinates of a real space. The virtual area setting method according to the aspect of the present disclosure includes: capturing an image or respective images of a subject and a robot in the real space to generate a captured image of the subject and the robot; recognizing a gesture represented by a motion of the subject based on the captured image; setting a virtual area in the virtual space based on coordinates of the subject in the virtual space when it is recognized that the gesture corresponds to a first gesture; and controlling display of the virtual area so that the robot is visible to the human eye. The virtual area corresponds to a boundary area in which an operation of the robot is restricted in the real space.

DETAILED DESCRIPTION

Figure 1:
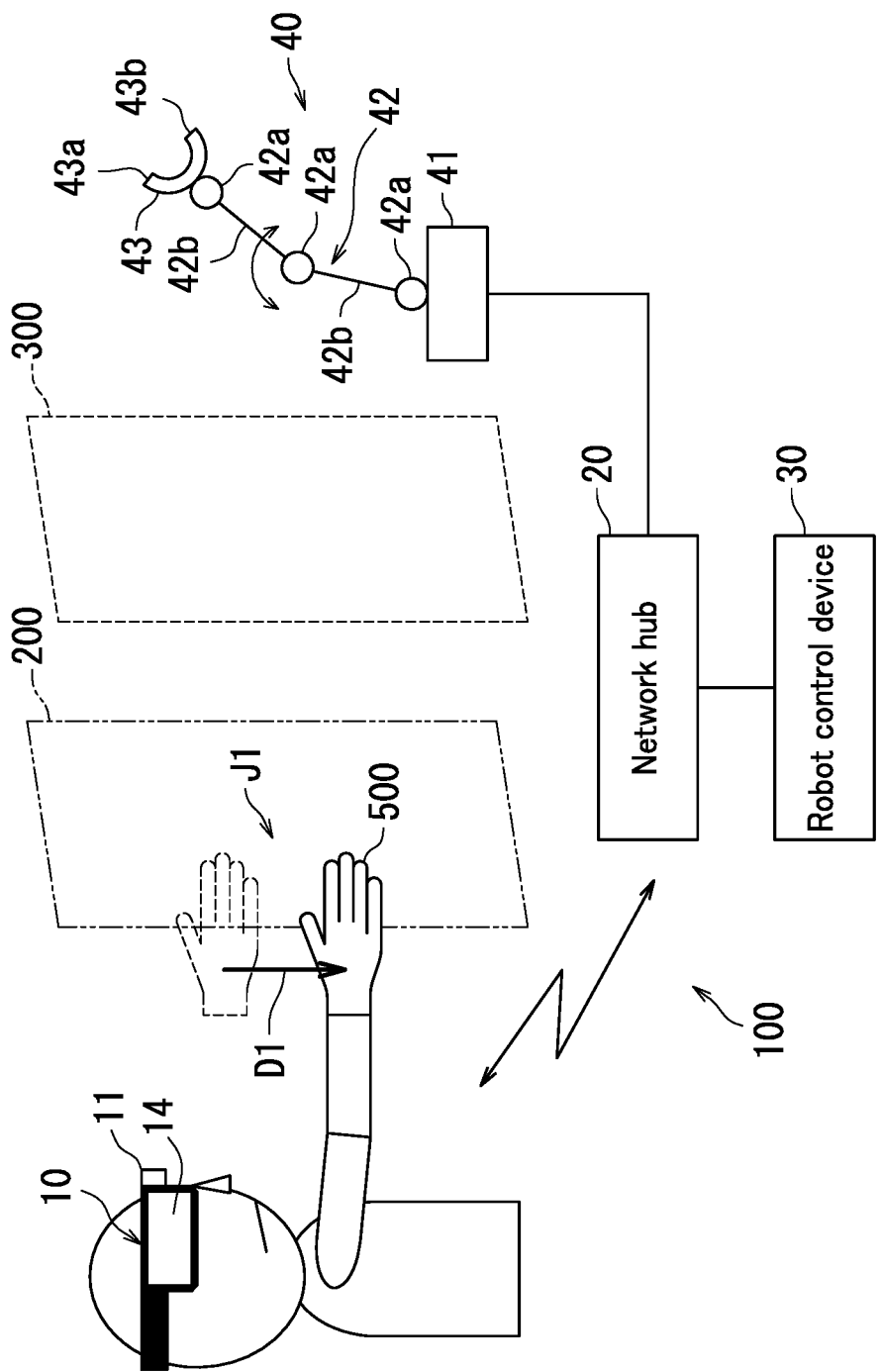
FIG. 1 illustrates a robotic system according to a first embodiment of the present disclosure.

Exemplary embodiments of the present disclosure will hereinafter be described with reference to the accompanying drawings. Elements that are the same or equivalent are labelled with the same reference signs in the drawings and description thereof is not repeated.

First Embodiment

A first embodiment of the present disclosure will be described with reference to FIGS. 1 to 7. The first embodiment enables a human to easily set a virtual area in which an operation of a robot is restricted using mixed reality (MR).

A configuration of a robotic system 100 according to the first embodiment will be described with reference to FIG. 1. FIG. 1 illustrates the robotic system 100. As illustrated in FIG. 1, the robotic system 100 includes a head-mounted display 10, a network hub 20, a robot control device 30, and the robot 40. The head-mounted display 10 associates coordinates of a virtual space with coordinates of a real space. The head-mounted display 10 corresponds to one example of an "electronic device".

In the first embodiment, the head-mounted display 10 is a video see-through wearable terminal. The head-mounted display 10 is allowed to be worn on a human head. The head-mounted display 10 displays an image so that the image is visible to the eye of a wearer. The wearer corresponds to one example of a "human".

The head-mounted display 10 includes an imaging section 11 and a display 14.

The imaging section 11 captures an image of a subject 500 in a field of view of the wearer of the head-mounted display 10. The imaging section 11 captures an image of the robot 40 in the field of view of the wearer of the head-mounted display 10. Specifically, the imaging section 11 captures an image or respective images of the subject 500 and the robot 40 in the real space to generate a captured image of the subject 500 and the robot 40. The imaging section 11 includes for example one or more cameras. Examples of the camera(s) include a complementary metal oxide semiconductor (CMOS) image sensor and a charge coupled device (CCD) image sensor.

In the first embodiment, the subject 500 is a hand of the wearer. Therefore, in the description below, the subject 500 is referred to as the hand 500 in order to facilitate understanding. The subject 500 may however be for example an object and not limited to the hand.

The display 14 display an image so that the image is visible to the eye of the wearer. The display 14 includes a display device. Examples of the display device include a liquid-crystal display and an organic electroluminescent (EL) display.

In the first embodiment, the display 14 displays an image obtained by mixing a captured image generated by the imaging section 11 and an object(s) in the virtual space. Specifically, the display 14 displays an image obtained by mixing the captured image of the hand 500 and the robot 40 and the virtual area 200 set in the virtual space.

The virtual area 200 is an area in which the operation of the robot 40 is restricted. In other words, the virtual area 200 corresponds to a boundary area 300 in which the operation of the robot 40 is restricted in the real space. Specifically, the boundary area 300 is an area representing a boundary, in the real space, between a work space of the robot 40 and a space in which the operation of the robot 40 is restricted or prohibited.

Each of shapes of the virtual and boundary areas 200 and 300 may be any shape and not limited to a plane shape. Each shape of the virtual and boundary areas 200 and 300 may be for example a three-dimensional shape. Examples of the three-dimensional shape include a shape surrounding a whole periphery of the robot 40 (for example square tube shape) and a shape arranged at part of the periphery of the robot 40 (for example L-shape).

The virtual area 200 is set in the virtual space by the head-mounted display 10 based on a specific gesture J1 by the hand 500. In the first embodiment, it is therefore possible to easily set the virtual area 200 in which the operation of the robot 40 is restricted. The specific gesture J1 is hereinafter referred to as a "first gesture J1".

Note that the head-mounted display 10 measures the real space to link the coordinates of the real space and the coordinates of the virtual space together. That is, the head-mounted display 10 enables "geometrical matching (positioning)" between the virtual space and the real space. Performance examples of the "geometrical matching (positioning)" between the virtual space and the real space may include performance based on an image obtained by the imaging section 11 (examples thereof include a marker base, a model base, and a nature feature base), performance based on information acquired by a physical sensor (examples thereof include a depth meter, an acceleration sensor, a gyro sensor, a magnetic sensor, and an inertial measurement unit), and performance based on the image obtained by the imaging section 11 and the information acquired by the physical sensor. The physical sensor is mounted on the head-mounted display 10.

In addition, the head-mounted display 10 converts coordinates of the virtual area 200 in the virtual space to the coordinates of the real space and calculates the boundary area 300 corresponding to the virtual area 200. The head-mounted display 10 then transmits information on the boundary area 300 (for example, coordinates of the boundary area 300 in the real space) to the robot control device 30 through the network hub 20.

The network hub 20 relays communication between the head-mounted display 10 and the robot control device 30. The network hub 20 also relays communication between the robot 40 and the robot control device 30.

Specifically, the network hub 20 performs wireless communication with the head-mounted display 10 to transmit and receive data thereto and therefrom. The type of the wireless communication is not particularly limited as long as the type of the wireless communication is the same as that of the head-mounted display 10. Note that the network hub 20 may perform wired communication with the head-mounted display 10.

In addition, the network hub 20 performs wired communication with the robot control device 30 and the robot 40 to transmit and receive data thereto and therefrom. The type of the wired communication is not particularly limited as long as data transmission and reception are possible. Note that the network hub 20 may perform wireless communication with the robot control device 30 and the robot 40.

The robot control device 30 controls the robot 40 through the network hub 20. Specifically, the robot control device 30 controls respective rotations of motors each of which is a driving source of the robot 40 in accordance with an operation pattern of the robot 40. The embodiment includes operation patterns determined for each of works to be performed by the robot 40. Each of the operation patterns represents a movement of the robot 40 according to a corresponding work.

In the first embodiment, the robot control device 30 receives information on the boundary area 300 in the real space from the head-mounted display 10 through the network hub 20 in particular. The robot control device 30 then controls the robot 40 based on the boundary area 300. Specifically, the robot control device 30 controls the operation of the robot 40 based on the boundary area 300.

For example, the robot control device 30 controls the robot 40 so that the robot 40 does not cross a boundary of the boundary area 300. For example, the robot control device 30 controls the robot 40 so that the robot 40 is stopped when crossing the boundary of the boundary area 300. Alternatively, the robot control device 30 controls the robot 40 so that the robot 40 decelerates when crossing the boundary of the boundary area 300. Note that the robot 40 crossing the boundary of the boundary area 300 means the robot 40 crossing the boundary of the boundary area 300 in a direction that the robot 40 leaves an installation position of the robot 40.

For example, in the case where a human or an object crosses the boundary of the boundary area 300 toward the robot 40, the robot control device 30 restricts the operation of the robot 40. Specifically, in the case where the human or the object crosses the boundary of the boundary area 300 toward the robot 40, the robot control device 30 controls the robot 40 so that the robot 40 is deactivated.

The robot 40 operates according to control by the robot control device 30. For example, the robot 40 holds an article. For example, the robot 40 moves the held article to a predetermined location.

Specifically, the robot 40 includes a base section 41, an arm section 42, and a hand section 43. The arm section 42 is arranged on the base section 41. The arm section 42 is freely movable from the base section 41 as a starting point in the real space.

Specifically, the arm section 42 includes joints 42a and arms 42b. The joints 42a are attached to the arms 42b with joints 42a provided on both ends of each arm 42. Each of the arms 42b rotates according to a corresponding joint 42a being driven. Each of the joints 42a is driven by a corresponding built-in motor. Each of the built-in motors is controlled by the robot control device 30. Thus, the robot control device 30 controls the respective built-in motors of the joints 42a, thereby controlling an operation of the arm section 42.

The hand section 43 holds the article. The hand section 43 is provided at a distal end of the arm section 42. Specifically, the hand section 43 is attached to a joint 42a at the distal end of the arm section 42. The hand section 43 includes a first finger 43a and a second finger 43b. The hand section 43 opens and closes the first and second fingers 43a and 43b, thereby releasing and holding the article. A built-in motor in the hand section 43 opens and closes the first and second fingers 43a and 43b. The built-in motor of the hand section 43 is controlled by the robot control device 30. Thus, the robot control device 30 controls the built-in motor of the hand section 43, thereby controlling an operation of the hand section 43.

Figure 2:
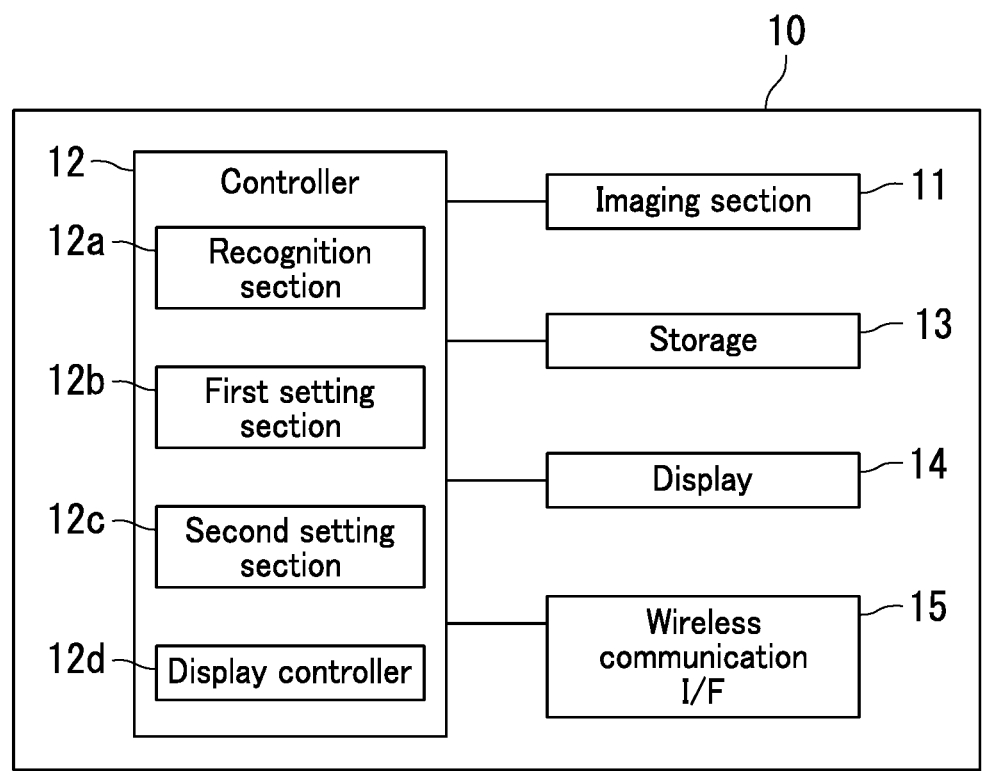
FIG. 2 illustrates a head-mounted display according to the first embodiment.

Next, the head-mounted display 10 will further be described with reference to FIG. 2. FIG. 2 illustrates the head-mounted display 10. As illustrated in FIG. 2, the head-mounted display 10 further includes a controller 12, storage 13, and a wireless communication interface (I/F) 15.

The wireless communication interface 15 performs wireless communication with the network hub 20. The wireless communication is for example short-range wireless communication. The short-range wireless communication is for example wireless communication with a communication distance of several meters to several ten meters. Examples of the short-range wireless communication include communication using BLUETOOTH (registered Japanese trademark), communication using ZIGBEE (registered Japanese trademark), and communication using WIFI (registered Japanese trademark).

The controller 12 controls the imaging section 11, the storage 13, the display 14, and the wireless communication interface 15. The controller 12 includes a processor such as a central processing unit (CPU).

The storage 13 includes a storage device and stores therein data and a computer program. Specifically, examples of the storage 13 include an auxiliary storage device and main memory such as semiconductor memory. Examples of the auxiliary storage device include semiconductor memory, a solid state drive, and a hard disk drive. The storage 13 may include removable media.

The controller 12 includes a recognition section 12a, a first setting section 12b, a second setting section 12c, and a display controller 12d. Specifically, the processor of the controller 12 executes the computer program stored in the storage device of the storage 13, thereby functioning as the recognition section 12a, the first setting section 12b, the second setting section 12c, and the display controller 12d.

The recognition section 12a recognizes a gesture represented by a motion of the hand 500 based on the captured image generated by the imaging section 11. Specifically, the recognition section 12a recognizes an image representing a gesture, contained in the captured image. In the case where the captured image contains an image representing a gesture, the recognition section 12a recognizes a gesture type represented by an image contained in the captured image. Specifically, the recognition section 12a detects presence or absence of the first gesture J1 to be contained in the captured image.

In addition, the recognition section 12a can detect presence or absence of a second gesture J2 to be contained in the captured image. The second gesture J2 is different from the first gesture J1. Moreover, the recognition section 12a can detect presence or absence of a third gesture J3 to be contained in the captured image. The third gesture J3 is different from the first and second gestures J1 and J2. Further, the recognition section 12a can detect presence or absence of a fourth gesture J4 to be contained in the captured image. The fourth gesture J4 is different from the first to third gestures J1 to J3.

In the case where the recognition section 12a recognizes that a gesture by the hand 500 corresponds to the first gesture J1, the first setting section 12b sets the virtual area 200 in the virtual space based on coordinates of the hand 500 in the virtual space.

The first embodiment therefore enables the wearer to easily set the virtual area 200 by making the first gesture J1. Here, in the virtual area 200, the operation of the robot 40 is restricted. For example, the virtual area 200 is defined by the coordinates of the virtual area 200 in the virtual space. The coordinates of the virtual area 200 in the virtual space are one example of information on the virtual area 200.

In the case where the recognition section 12a recognizes that a gesture by the hand 500 corresponds to the second gesture J2, the first setting section 12b changes a size of the virtual area 200 based on the coordinates of the hand 500 in the virtual space. The first embodiment therefore enables the wearer to easily change the size of the virtual area 200 in the virtual space by making the second gesture J2.

In the case where the recognition section 12a recognizes that a gesture by the hand 500 corresponds to the third gesture J3, the first setting section 12b changes an orientation of the virtual area 200 based on the coordinates of the hand 500 in the virtual space. The first embodiment therefore enables the wearer to easily change the orientation of the virtual area 200 in the virtual space by making the third gesture J3.

In the case where the recognition section 12a recognizes that a gesture by the hand 500 corresponds to the fourth gesture J4, the first setting section 12b moves the virtual area 200 based on the coordinates of the hand 500 in the virtual space. The first embodiment therefore enables the wearer to easily change a location of the virtual area 200 in the virtual space by making the fourth gesture J4.

The second setting section 12c converts the coordinates of the virtual area 200 to the coordinates of the real space. Such coordinate conversion can be used without any particular limitation as long as the coordinate conversion has been already used in the mixed reality field.

The second setting section 12c sets the boundary area 300 in the real space based on the virtual area 200 after the coordinate conversion. The first embodiment therefore controls the robot 40 based on the boundary area 300, thereby making it possible to easily restrict the operation of the robot 40.

For example, the boundary area 300 is defined by the coordinates of the boundary area 300 in the real space. The coordinates of the boundary area 300 in the virtual space are one example of information on the boundary area 300 in the virtual space. The coordinates of the boundary area 300 are represented for example by a coordinate system where the robot 40 is placed in the real space.

Specifically, the second setting section 12c sets the virtual area 200 after the coordinate conversion as the boundary area 300 in the real space. The virtual area 200 after the coordinate conversion is represented by the coordinates in the real space.

The second setting section 12c may however set the boundary area 300 based on the virtual area 200 after the coordinate conversion and a maximum movable range of the robot 40. This enables setting of a more appropriate boundary area 300 according to the maximum movable range of the robot 40. Information on the maximum movable range of the robot 40 is stored in the storage 13.

In addition, the second setting section 12c may set, based on the virtual area 200 after the coordinate conversion and an operation pattern of the robot 40, a boundary area 300 according to an operation pattern, corresponding to the operation pattern of the robot 40, of the operation patterns. This enables setting of a more appropriate boundary area 300 according to the operation pattern of the robot 40. Information on the operation patterns of the robot 40 is stored in the storage 13.

Note that the second setting section 12c may set the boundary area 300 based on the virtual area 200 after the coordinate conversion, the maximum movable range of the robot 40, and an operation pattern of the robot 40.

The display controller 12d controls display of the virtual area 200 so that the robot 40 is visible to the eye of the wearer. The first embodiment therefore enables the wearer to easily set the virtual area 200 by making the first gesture J1 while viewing the robot 40 and the virtual area 200.

Similarly, the embodiment enables the wearer to easily change the size, the orientation, and the location of the virtual area 200 by making the second gesture J2, the third gesture J3, and the fourth gesture J4, respectively, while viewing the robot 40 and the virtual area 200.

In the first embodiment, the display controller 12d causes the display 14 to display the virtual area 200 so that the robot 40 is visible to the eye of the wearer. Specifically, the display controller 12d generates an image obtained by superposing the virtual area 200 on an image of the robot 40. The display controller 12d provides the image to the display 14.

Figure 3A:
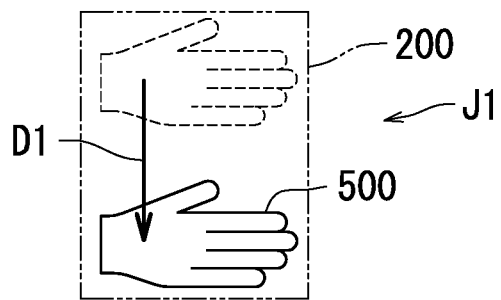
FIG. 3A illustrates an example of a first gesture in the first embodiment.
Figure 3B:
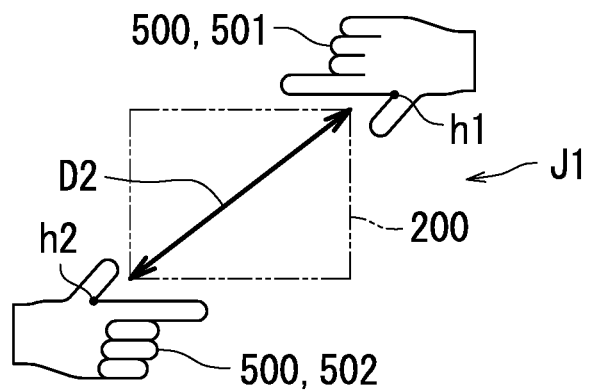
FIG. 3B illustrates another example of the first gesture in the first embodiment.
Figure 3C:
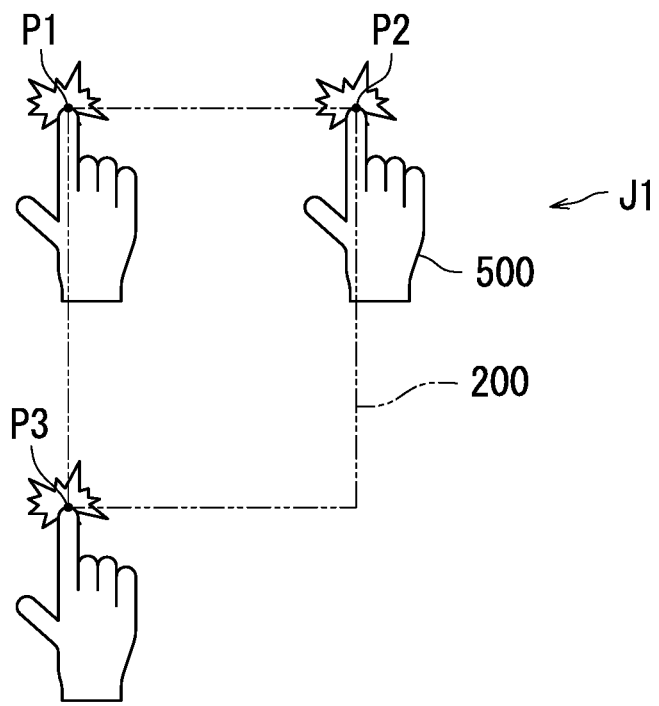
FIG. 3C illustrates still another example of the first gesture in the first embodiment.

The gestures in the first embodiment will next be described with reference to FIGS. 3A to 5. Each of FIGS. 3A, 3B, and 3C illustrates the first gesture J1. The first gesture J1 functions as an instruction causing the first setting section 12b to set the virtual area 200 in the virtual space.

FIG. 3A illustrates the first gesture J1 described with reference to FIG. 1. As illustrated in FIG. 3A, the first gesture J1 is a gesture represented by the wearer moving the hand 500 in a first direction D1.

In the example of FIG. 3A, the virtual area 200 is set to a rectangular shape extending in the first direction D1 by the first gesture J1. Note that although the first direction D1 is substantially parallel to a vertical direction in the example of the FIG. 3A, the first direction D1 is not limited in particular. For example, the first direction D1 may be substantially parallel to a horizontal direction.

FIG. 3B illustrates another example of the first gesture J1. As illustrated in FIG. 3B, the first gesture J1 is a gesture represented by the wearer moving his or her right and left hands 501 and 502 in a second direction D2 so that a base h1 between a thumb and a forefinger of the right hand 501 is separated from a base h2 between a thumb and a forefinger of the left hand 502.

In the example of FIG. 3B, the virtual area 200 is set to a rectangular shape whose diagonal ends corresponds to the bases h1 and h2. Note that although the second direction D2 is a diagonal direction going up from left to right in the example of FIG. 3B, the second direction D2 is not limited in particular. For example, the second direction D2 may be a diagonal direction going down from left to right.

FIG. 3C illustrates still another example of the first gesture J1. As illustrated in FIG. 3C, the first gesture J1 is a gesture represented by the wearer tapping desired locations in the space with the forefinger of the hand 500 to determine corners of the virtual area 200. In the example of FIG. 3C, the virtual area 200 is set to a rectangular shape as a result of a point P1, a point P2, and a point P3 being tapped.

Figure 4:
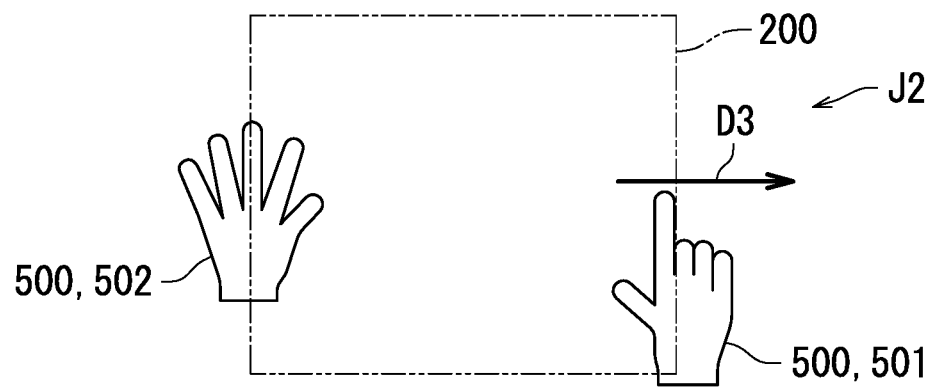
FIG. 4 illustrates a second gesture in the first embodiment.

FIG. 4 illustrates the second gesture J2. As illustrated in FIG. 4, the second gesture J2 is a gesture represented by the wearer pressing a left side of the virtual area 200 with the left hand 502 and sliding a right side of the virtual area 200 in a third direction D3 while pressing or dragging the right side of the virtual area 200 with the forefinger of the right hand 501. The right side of the virtual area 200 is moved in the third direction D3 by the second gesture J2, so that the size of the virtual area 200 is changed. Note that part of the virtual area 200 pressed with the forefinger of the right hand 501 is not necessarily an end of the virtual area 200. In this case, the virtual area 200 can be extended to a point where the right hand 501 does not actually reach.

Note that although the third direction D3 is a right direction in the example of FIG. 4, the third direction D3 is not limited in particular. For example, the third direction D3 may be a left direction. In addition, the second gesture J2 may be a gesture represented by the wearer pressing the right side of the virtual area 200 with the right hand 501 and sliding the left side of the virtual area 200 in a third direction D3 (left direction) while pressing or dragging the left side of the virtual area 200 with the forefinger of the left hand 502.

Figure 5:
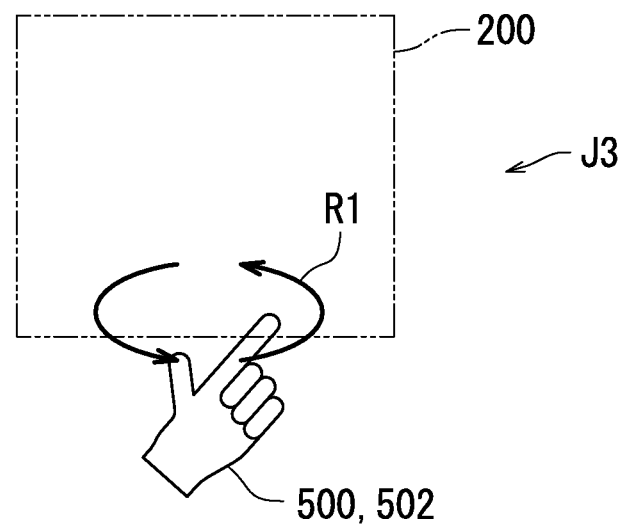
FIG. 5 illustrates a third gesture in the first embodiment.

FIG. 5 illustrates the third gesture J3. As illustrated in FIG. 5, the third gesture J3 is a gesture represented by the wearer opening the thumb and the forefinger of the hand 500 and rotating the fingers in a rotational direction R1 in the virtual area 200. The virtual area 200 is rotated according to the third gesture J3 and the orientation of the virtual area 200 is changed. Note that although the rotational direction R1 is a counterclockwise direction in the example of FIG. 5, the rotational direction R1 is not limited in particular. The rotational direction R1 may be a clockwise direction.

A virtual area setting method performed by the head-mounted display 10 will next be described with reference to FIGS. 6 and 7. In the virtual area setting method, the virtual area 200 is set in coordinates of the virtual space associated with the coordinates of the real space.

Figure 6:
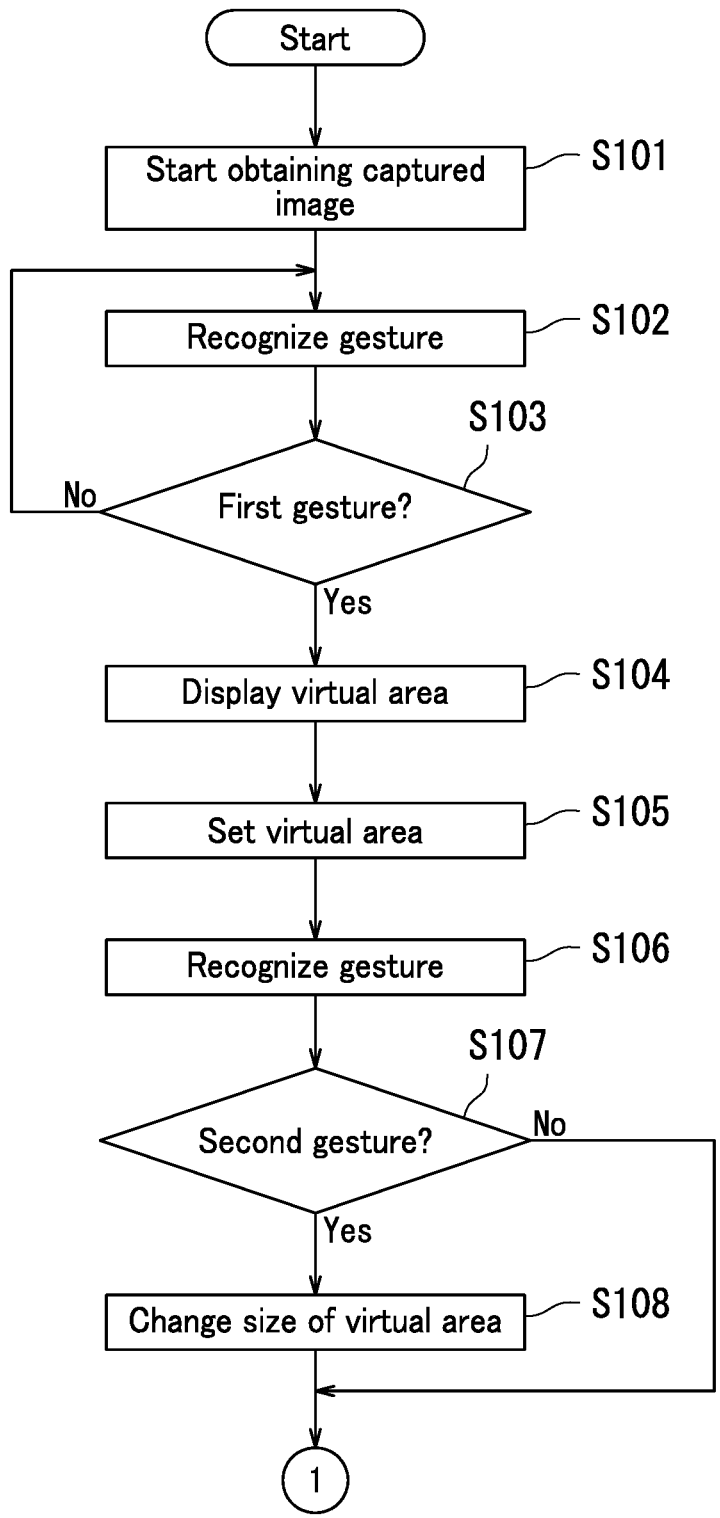
FIG. 6 is part of a flowchart illustrating an operation of a controller of the head-mounted display according to the first embodiment.
Figure 7:
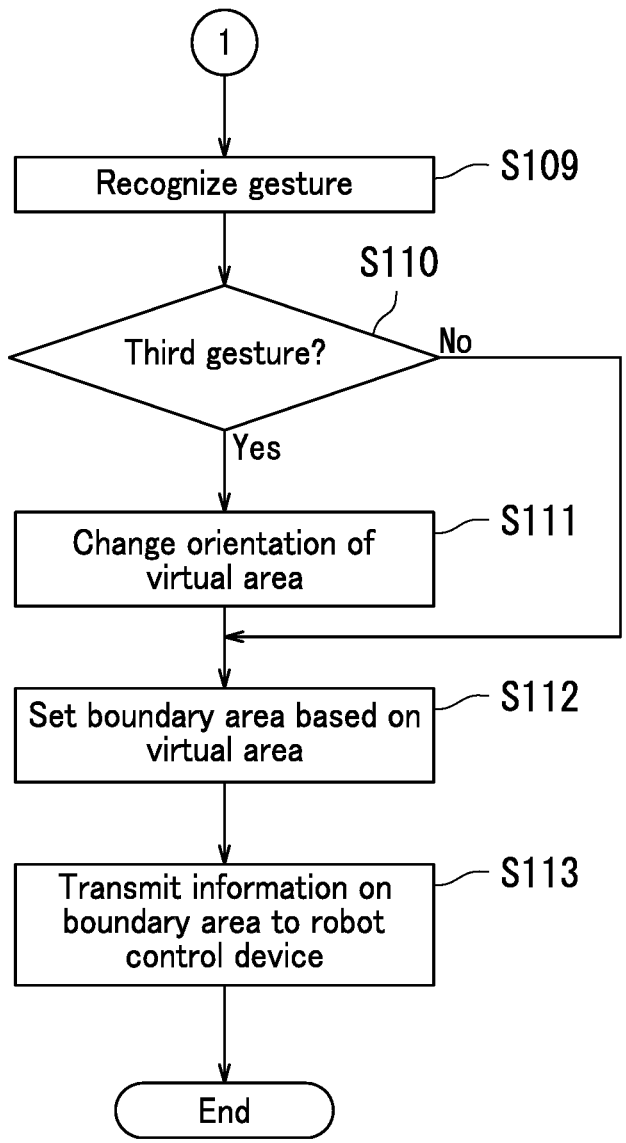
FIG. 7 is the remaining part of the flowchart illustrating the operation of the controller of the head-mounted display according to the first embodiment.

FIGS. 6 and 7 depict part and the remaining part of a flowchart illustrating an operation of the controller 12 of the head-mounted display 10. That is, FIGS. 6 and 7 illustrate the virtual area setting method performed by the controller 12 of the head-mounted display 10. As illustrated in FIGS. 6 and 7, the virtual area setting method includes Steps S101 to S113. The controller 12 therefore executes each of Steps S101 to S113 in a process depicted in the flowchart.

The operation illustrated in FIGS. 6 and 7 starts when a human wears the head-mounted display 10 on the head and the head-mounted display 10 is activated.

As illustrated in FIG. 6, at Step S101, the recognition section 12a of the controller 12 starts obtaining the captured image from the imaging section 11. That is, the imaging section 11 captures an image or respective images of the hand 500 and the robot 40 in the real space and generates a captured image of the hand 500 and the robot 40. The process then proceeds to Step S102.

At Step S102, the recognition section 12a recognizes a gesture represented by a motion of the hand 500 based on the captured image. The process then proceeds to Step S103.

At Step S103, the recognition section 12a determines whether or not the gesture corresponds to the first gesture J1. At Step S103, when it is determined that the gesture does not correspond to the first gesture J1 (No at Step S103), the process proceeds to Step S102. In contrast, at Step S103, when it is determined that the gesture corresponds to the first gesture J1 (Yes at Step S103), the process proceeds to Step S104.

At Step S104, the display controller 12d of the controller 12 controls display of the virtual area 200 according to the first gesture J1 so that the robot 40 is visible to the eye of the wearer. In the first embodiment, the display controller 12d causes the display 14 to display the virtual area 200 so that the robot 40 is visible to the eye of the wearer. Specifically, the display controller 12d controls the display 14 so that the display 14 displays the robot 40 and the virtual area 200. The process then proceeds to Step S105.

At Step S105, the first setting section 12b of the controller 12 sets the virtual area 200 in the virtual space based on the coordinates of the hand 500 in the virtual space. Specifically, when the first gesture J1 is stopped, the first setting section 12b sets the virtual area 200 in the virtual space based on the coordinates of the hand 500 in the virtual space. Note that even at Step S104, the first setting section 12b defines the virtual area 200 based on the coordinates, in the virtual space, of the hand 500 performing the first gesture J1 (namely, moving hand 500). The process then proceeds to Step S106.

At Step S106, the recognition section 12a recognizes the gesture based on the captured image. The process then proceeds to Step S107.

At Step S107, the recognition section 12a determines whether or not the gesture corresponds to the second gesture J2. At Step S107, when it is determined that the gesture does not correspond to the second gesture J2 (No at Step S107), the process then proceeds to Step S109 illustrated in FIG. 7. In contrast, at Step S107, when it is determined that the gesture corresponds to the second gesture J2 (Yes at Step S107), the process proceeds to Step S108.

At Step S108, the first setting section 12b changes the side of the virtual area 200 according to the second gesture J2. The process then proceeds to Step S109 illustrated in FIG. 7.

As illustrated in FIG. 7, at Step S109, the recognition section 12a recognizes the gesture based on the captured image. The process then proceeds to Step S110.

At Step S110, the recognition section 12a determines whether or not the gesture corresponds to the third gesture J3. At Step S110, when it is determined that the gesture does not correspond to the third gesture J3 (No at Step S110), the process proceeds to Step S112. In contrast, at Step S110, when it is determined that the gesture corresponds to the third gesture J3 (Yes at Step S110), the process proceeds to Step S111.

At Step S111, the first setting section 12b changes the orientation of the virtual area 200 according to the third gesture J3. The process then proceeds to Step S112. At Step S112, the second setting section 12c of the controller 12 converts the coordinates of the virtual area 200 to the coordinates of the real space and sets the boundary area 300 based on the virtual area 200 after the coordinate conversion. Note that at Step S112, the second setting section 12c may set the boundary area 300 based on the maximum movable range and/or the operation pattern of the robot 40, and the virtual area 200 after the coordinate conversion. The process then proceeds to Step S113.

At Step S113, the controller 12 transmits information on the boundary area 300 to the robot control device 30. The process illustrated in FIGS. 6 and 7 then ends.

As above, the robotic system 100 according to the first embodiment of the present disclosure has been described with reference to FIGS. 1 to 7. The first embodiment enables the wearer of the head-mounted display 10 to easily set the virtual area 200 and the boundary area 300 using the mixed reality. Further, the first embodiment need not change the configuration of the robot control device 30, thus enabling a reduction in cost for introduction of the robotic system 100.

Second Embodiment

A second embodiment of the present disclosure will be described with reference to FIGS. 1, 8, and 9. The second embodiment enables a human to easily set a virtual area 200 using mixed reality. Here, in the virtual area 200, an operation of a robot 10 is restricted.

A subject that sets a boundary area 300 corresponding to the virtual area 200 in the second embodiment is different from that in the first embodiment. Specifically, in the first embodiment, the head-mounted display 10 sets the boundary area 300 based on the virtual area 200. In contrast, in the second embodiment, a robot control device 30 sets the boundary area 300 based on the virtual area 200.

Respective configurations of the first and second embodiments are the same as each other except that the subjects are different from each other as described above. Therefore, of constituent elements of the second embodiment, identical constituent elements to those of the first embodiment are not described.

A head-mounted display 10 in the second embodiment sets the virtual area 200 and does not set the boundary area 300. The head-mounted display 10 in the second embodiment therefore includes no second setting section 12c unlike the first embodiment. Therefore, the head-mounted display 10 in the second embodiment performs Steps S101 to S111 and does not perform Step S112. Also in the second embodiment, at Step S113, the head-mounted display 10 transmits information on the virtual area 200 (for example, coordinates of the virtual area 200 in a virtual space) to the robot control device 30.

Figure 8:
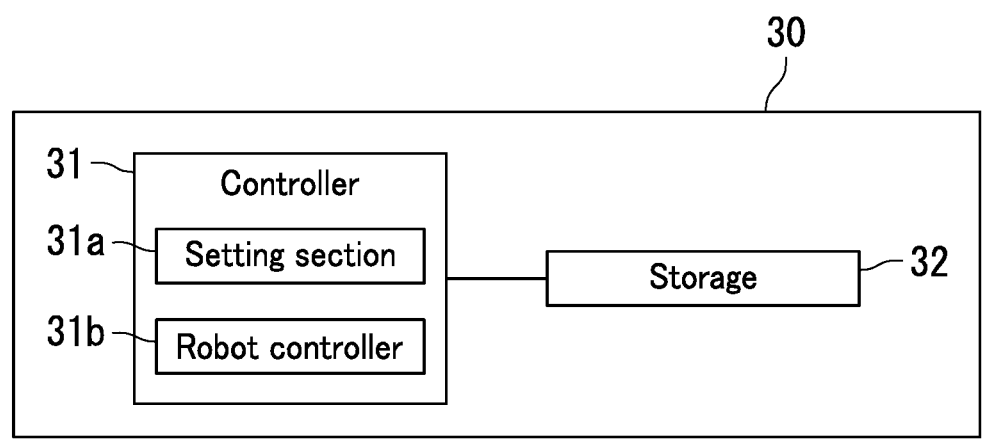
FIG. 8 illustrates a robot control device in a second embodiment of the present disclosure.

FIG. 8 illustrates the robot control device 30 in the second embodiment. As illustrated in FIG. 8, the robot control device 30 includes a controller 31 and storage 32.

The controller 31 controls the storage 32. The controller 31 includes a processor such as a CPU. The storage 32 includes a storage device and stores therein data and a computer program. Specifically, examples of the storage 32 include an auxiliary storage device and main memory such as semiconductor memory. Examples of the auxiliary storage device include semiconductor memory, a solid state drive, and a hard disk drive. The storage 32 may include removable media.

The controller 31 includes a setting section 31a and a robot controller 31b. Specifically, the processor of the controller 31 executes the computer program stored in the storage device of the storage 32, thereby functioning as the setting section 31a and the robot controller 31b.

The setting section 31a performs processing similar to that of the second setting section 12c illustrated in FIG. 2. That is, the setting section 31a sets the boundary area 300 based on the virtual area 200. Here, in the boundary area 300, an operation of the robot 40 is restricted. Specifically, the setting section 31a receives information on the virtual area 200 in the virtual space from the head-mounted display 10. Specifically, the information represents the coordinates of the virtual area 200 in the virtual space. The setting section 31a then converts the coordinates of the virtual area 200 in the virtual space to coordinates of a real space. Such coordinate conversion is performed using the same method as that used in the second setting section 12c in the first embodiment. The setting section 31a sets the boundary area 300 based on the virtual area 200 after the coordinate conversion. Other processing of the setting section 31a is similar to that of the second setting section 12c illustrated in FIG. 2.

The setting section 31a may set the boundary area 300 based on a maximum movable range of the robot 40 and the virtual area 200 after the coordinate conversion. This enables setting of a more appropriate boundary area 300 according to the maximum movable range of the robot 40. Information on the maximum movable range of the robot 40 is stored in the storage 32.

Further, the setting section 31a may set, based on the virtual area 200 after the coordinate conversion and an operation pattern of the robot 40, a boundary area 300 according to an operation pattern, corresponding to the operation pattern of the robot 40, of operation patterns. This enables setting of a more appropriate boundary area 300 according to the operation pattern of the robot 40. Information on the operation patterns of the robot 40 is stored in the storage 32.

The robot controller 31b controls the robot 40 through a network hub 20 based on the operation patterns stored in the storage 32. In the second embodiment, the robot controller 31b restricts the operation of the robot 40 based on the boundary area 300 in particular.

A process by the controller 31 of the robot control device 30 when setting the boundary area 300 will next be described with reference to FIG. 9. The operation illustrated in FIG. 9 starts when the head-mounted display 10 transmits the information on the virtual area 200.

Figure 9:
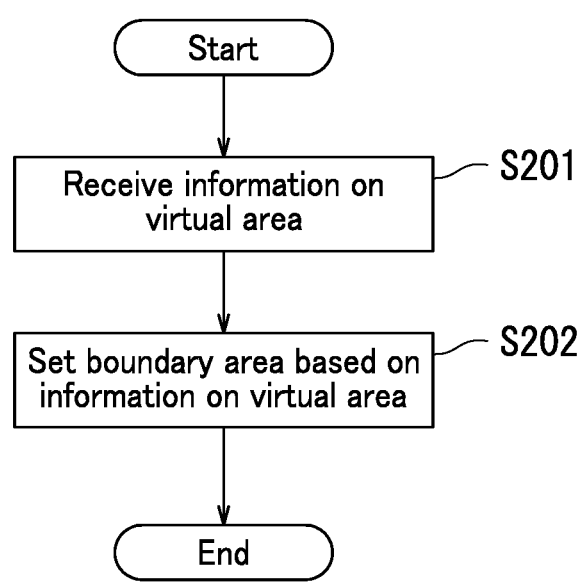
FIG. 9 is a flowchart illustrating an operation of a controller of the robot control device in the second embodiment.

As illustrated in FIGS. 8 and 9, at Step S201, the setting section 31a of the controller 31 receives the information on the virtual area 200 from the head-mounted display 10. The process then proceeds to Step S202.

At Step S202, the setting section 31a sets a boundary area 300 based on the information on the virtual area 200. Specifically, the setting section 31a sets the boundary area 300 based on the virtual area 200 after the coordinate conversion to the real space. Note that at Step S202, the setting section 31a may set the boundary area 300 based on the maximum movable range and/or the operation pattern of the robot 40 and the virtual area 200 after the coordinate conversion to the real space. The process illustrated in FIG. 9 then ends.

As above, the robotic system 100 according to the second embodiment of the present disclosure has been described with reference to FIGS. 8 to 9. The second embodiment enables a human to easily set the virtual area 200 and the boundary area 300 using mixed reality. The second embodiment also enables a reduction in a load applied to the head-mounted display 10 when the robot control device 30 sets the boundary area 300.

As above, the embodiments of the present disclosure have been described with reference to the drawings. However, the present disclosure is not limited to the above-described embodiments and can be practiced in various ways within the scope without departing from the essence of the present disclosure (for example, (1) and (2) described below). Furthermore, the constituent elements disclosed in the above-described embodiments may be altered as appropriate. For example, some of all constituent elements illustrated in an embodiment may be added to constituent elements of another embodiment. Alternatively, some of all constituent elements illustrated in an embodiment may be removed from the embodiment.

The drawings mainly illustrate schematic constituent elements in order to facilitate understanding of the disclosure, and thickness, length, numbers, intervals or the like of constituent elements illustrated in the drawings may differ from actual ones thereof in order to facilitate preparation of the drawings. Further, the configuration of each constituent element described in the above embodiments is merely one example that does not impose any particular limitations and may be altered in various ways as long as such alterations do not substantially deviate from the effects of the present disclosure.

(1) Although the electronic device is a video see-through head-mounted display 10 in the embodiments of the present disclosure, the present disclosure is not limited to this. For example, the electronic device may be an optical see-through head-mounted display. The optical see-through head-mounted display renders human surroundings visible to the human eye. In this case, the head-mounted display may project (image) a virtual area 200 onto a human retina or an optical coupling element such as a half mirror, or may display the virtual area 200 on a display element that transmits light, such as a liquid-crystal display. Note that the display 14 illustrated in FIG. 2 is unnecessary in the case where the virtual area 200 is projected (imaged) on the human retina. The electronic device may be a terminal device. The terminal device is for example a mobile terminal device. The mobile terminal device is for example a smartphone. Using the mobile terminal device such as the smartphone enables introduction of the robotic system 100 at lower cost.

(2) Although a motion of a human hand 500 is utilized as a gesture in the embodiments of the present disclosure, the present disclosure is not limited to this. For example, a motion of an operation member having a predetermined shape (for example, a pen having a predetermined shape) may be utilized as a gesture. That is, the subject 500 may be the operation member.

What is claimed is:

1. An electronic device comprising:
   an imaging section;
   a recognition section configured to recognize a gesture represented by a motion of a subject based on a first captured image generated by the imaging section and including an image of the subject and an image of a robot in a real space;
   a first setting section configured to set a virtual area in the virtual space based on coordinates of the subject in the virtual space when it is recognized that the gesture corresponds to a first gesture, the virtual space having coordinates associated in advance with coordinates of the real space; and a display controller configured to superimpose the virtual area on a second captured image, the second captured image being generated by the imaging section and including the image of the robot to obtain a superimposed image, and control display of the superimposed image, wherein the virtual area corresponds to a boundary area in which an operation of the robot is restricted in the real space, and the first setting section sets the virtual area in the virtual space based on the coordinates of the subject in the virtual space in a state of the first gesture being stopped.

2. The electronic device according to claim 1, wherein when it is recognized that the gesture corresponds to a second gesture that is different from the first gesture, the first setting section changes a size of the virtual area based on the coordinates of the subject in the virtual space.

3. The electronic device according to claim 1, wherein when it is recognized that the gesture corresponds to a third gesture that is different from the first gesture, the first setting section changes an orientation of the virtual area based on the coordinates of the subject in the virtual space.

4. The electronic device according to claim 1, further comprising a second setting section configured to perform coordinate conversion by converting coordinates of the virtual area to the coordinates of the real space, and set the boundary area based on the virtual area after the coordinate conversion.

5. The electronic device according to claim 4, wherein the second setting section sets the boundary area based on the virtual area after the coordinate conversion and a maximum movable range of the robot.

6. The electronic device according to claim 4, wherein the second setting section sets, based on an operation pattern of the robot and the converted virtual area, the boundary area according to an operation pattern, corresponding to the operation pattern of the robot, of operation patters.

7. The electronic device according to claim 1, wherein the electronic device is a wearable terminal.

8. A virtual area setting method comprising:
generating a captured image;
recognizing a gesture represented by a motion of a subject based on a first captured image including an image of the subject and an image of a robot in a real space;
setting the virtual area in the virtual space based on coordinates of the subject in the virtual space when it is recognized that the gesture corresponds to a first gesture, the vertical space having coordinates associated in advance with coordinates of the real space; and
superimposing the virtual area on a second captured image to obtain a superimposed image and controlling display of the second captured image including the image of the robot, wherein the virtual area corresponds to a boundary area in which an operation of the robot is restricted in the real space, and in the setting the virtual area, the virtual area is set in the virtual space based on the coordinates of the subject in the virtual space in a state of the first gesture being stopped.

9. An electronic device according to claim 1, further comprising:
an imaging section;
a recognition section configured to recognize a gesture represented by a motion of a subject based on a first captured image generated by the imaging section and including an image of the subject and an image of a robot in a real space;
a setting section configured to set a virtual area in the virtual space based on coordinates of the subject in the virtual space when it is recognized that the gesture corresponds to a first gesture, the virtual space having coordinates associated in advance with coordinates of the real space; and
a display controller configured to superimpose the virtual area on a second captured image, the second captured image being generated by the imaging section and including the image of the robot to obtain a superimposed image, and control display of the superimposed image, wherein the virtual area corresponds to a boundary area in which an operation of the robot is restricted in the real space, the electronic device further comprises a display configured to be allowed to be worn on a human, the imaging section is integral with the display, and the display controller
causes the display to display the first captured image, and
superimposes the virtual area on the second captured image to obtain a superimposed image, and causes the display to display the superimposed image.

* * * * *